(12) United States Patent
Leblanc et al.

(10) Patent No.: US 6,341,670 B1
(45) Date of Patent: Jan. 29, 2002

(54) BRAKE WEAR MANAGING SYSTEM

(75) Inventors: Daniel Leblanc, Lachine; Sébastien Hardy, Laval, both of (CA)

(73) Assignee: Rideau Bulk Ltd., North Gower (CA)

( * ) Notice: Subject to any disclaimer, the term of this patent is extended or adjusted under 35 U.S.C. 154(b) by 0 days.

(21) Appl. No.: 09/505,964

(22) Filed: Feb. 17, 2000

(30) Foreign Application Priority Data

Feb. 19, 1999 (CA) .............................................. 2262337

(51) Int. Cl.[7] .............................................. F16D 66/00
(52) U.S. Cl. .............................. 188/1.11 L; 188/1.11 E; 340/454
(58) Field of Search ....................... 188/1.11 R, 1.11 E, 188/1.11 L, 1.11 W; 340/454

(56) References Cited

U.S. PATENT DOCUMENTS

| | | | |
|---|---|---|---|
| 4,279,214 A | 7/1981 | Thorn | |
| 4,800,991 A | 1/1989 | Miller | |
| 4,937,554 A | * 6/1990 | Herman | 188/1.11 W |
| 5,253,735 A | * 10/1993 | Larson et al. | 188/1.11 W |
| 5,320,198 A | 6/1994 | Hoyt et al. | |
| 5,339,069 A | * 8/1994 | Penner et al. | 188/1.11 W |
| 5,372,221 A | * 12/1994 | Jalbert | 188/1.11 W |
| 5,433,296 A | * 7/1995 | Webberley | 188/1.11 W |
| 5,474,154 A | 12/1995 | Coale | |
| 5,791,441 A | * 8/1998 | Matos et al. | 188/1.11 L |
| 5,825,287 A | * 10/1998 | Zarybnicky et al. | 188/1.11 W |
| 6,006,868 A | * 12/1999 | Klink | 188/1.11 W |
| 6,047,793 A | * 4/2000 | Hasegawa et al. | 188/1.11 W |
| 6,105,730 A | * 8/2000 | Ekeroth | 188/1.11 W |
| 6,110,068 A | * 8/2000 | Kraska | 475/146 |
| 6,112,859 A | * 9/2000 | Shuck et al. | 188/1.11 L |
| 6,158,822 A | * 12/2000 | Shirai et al. | 188/1.11 L |

FOREIGN PATENT DOCUMENTS

| | | |
|---|---|---|
| CA | 2195608 | 1/1997 |
| CA | 2216494 | 11/1997 |

* cited by examiner

*Primary Examiner*—Douglas C. Butler
*Assistant Examiner*—Devon Kramer
(74) *Attorney, Agent, or Firm*—Goudreau Gage Dubuc (57) ABSTRACT

A brake wear managing system is disclosed herein. The brake wear managing system comprises a plurality of sensor assemblies, an on-board controller and, optionally, a remote controller. The sensor assembly includes a mounting assembly and a sensor to measure the wear of a brake assembly and to generate a signal accordingly. Each sensor is coupled to the on-board controller. The on-board controller is configured to generate brake wear condition signals in response to the signal generated by each sensor. The optional remote controller is directly connected to the on-board controller or coupled to it via a wireless communication signal. The remote controller is configured to be operated either in maintenance mode or in operational mode.

21 Claims, 5 Drawing Sheets

FIG-2

BRAKE WEAR MANAGING SYSTEM

FIELD OF THE INVENTION

The present invention relates to systems for managing brake wear on a vehicle provided with brake assemblies.

BACKGROUND OF THE INVENTION

Brake wear managing systems are particularly advantageous when provided in heavy vehicles since the weight of such vehicles makes braking more difficult and potential loss of control more hazardous than in the case of lighter vehicles, such as for example, automobiles. Routine inspections of heavy vehicles must therefore be done more often to ensure the safety of the driver and of the public. The conventional way to perform the inspection is to visually inspect the brake assemblies.

Routine inspections are however costly since, a) the vehicle must be kept off the road during the inspection, b) a mechanic is required, and c) the wear on one or more brake assemblies can already be too important, resulting in premature wear of the other brake assemblies.

A solution has been proposed by Thorn in U.S. Pat. No. 4,729,214 issued on Jul. 21, 1981 and entitled "Brake Wear Indicator". Thorn describes a brake wear indicator comprising a sleeve that loosely fits over the push rod of the pneumatic actuator of a truck drum brake assembly. Indicia are calibrated on the exterior surface of the sleeve whereby the inspector can directly observe the degree of sleeve travel that corresponds to the push rod travel in the brake assembly.

Thorn's system has many drawbacks. For example, the person doing the inspection must know when the push rod travel is unacceptable. This can be seen as a drawback since this visual inspection is based on subjective criteria. Furthermore, the indication is difficult to access and cannot be operated while the truck is running. Finally, since the inspection is based on subjective criteria, it can be difficult to foresee as to when brake adjustments will be necessary, as well as to perform diagnostics.

Solutions to some of these drawbacks have been proposed by Larson et al. in U.S. Pat. No. 5,253,735 issued on Oct. 19, 1993 and entitled "Apparatus to Sense and Annunciate Truck Brake Condition". Larson et al.'s apparatus includes two Hall effect switches that sense the rotation of disks mounted to the S-cam shaft of the braking system. Sensor data are transmitted to an annunciator mounted at a distance from the brake assembly. Separate sensing and annunciating systems are provided for each wheel of the truck.

While some drawbacks of Thorn's system have been overcome by Larson et al., their apparatus does not allow making any forecast as to when brake adjustments will be necessary. Furthermore, Larson et al.'s system does not directly monitor the push rod. The measure is taken further from the actuating linkage. That can produce less reliable measurements.

Other problems with brake monitoring systems of the prior-art include the difficulty to manage brake changes for fleets of vehicles since they do not allow remote monitoring of vehicles and the fact they don't provide any visual tool to assess the operating performance of their sensors to help identify problems of the brake assemblies.

OBJECT OF THE INVENTION

An object of the present invention is therefore to provide a brake wear managing system free of the above-mentioned drawbacks of the prior-art.

SUMMARY OF THE INVENTION

More specifically, in accordance with the present invention, there is provided a brake wear managing system for a vehicle provided with at least one brake assembly, the brake wear managing system comprising:

at least one sensor assembly including a sensor and a mounting assembly to secure the sensor to one of at least one brake assembly; each sensor being so configured as to generate a signal responsive to brake wear; and an on-board controller coupled to each sensor; the on-board controller being configured to receive said signal from each sensor and to generate brake wear condition signals accordingly.

According to a preferred embodiment of the present invention, the brake wear managing system further comprises a remote controller coupled to the on-board controller and being configured to receive at least one of a) the sensor signals and b) the break wear condition signals. The remote controller is so configured as to generate break wear history database.

Other objects, advantages and features of the present invention will become more apparent upon reading of the following non-restrictive description of preferred embodiments thereof, given by way of example only with reference to the accompanying drawings.

DESCRIPTION OF THE PREFERRED EMBODIMENT

Figure 1:
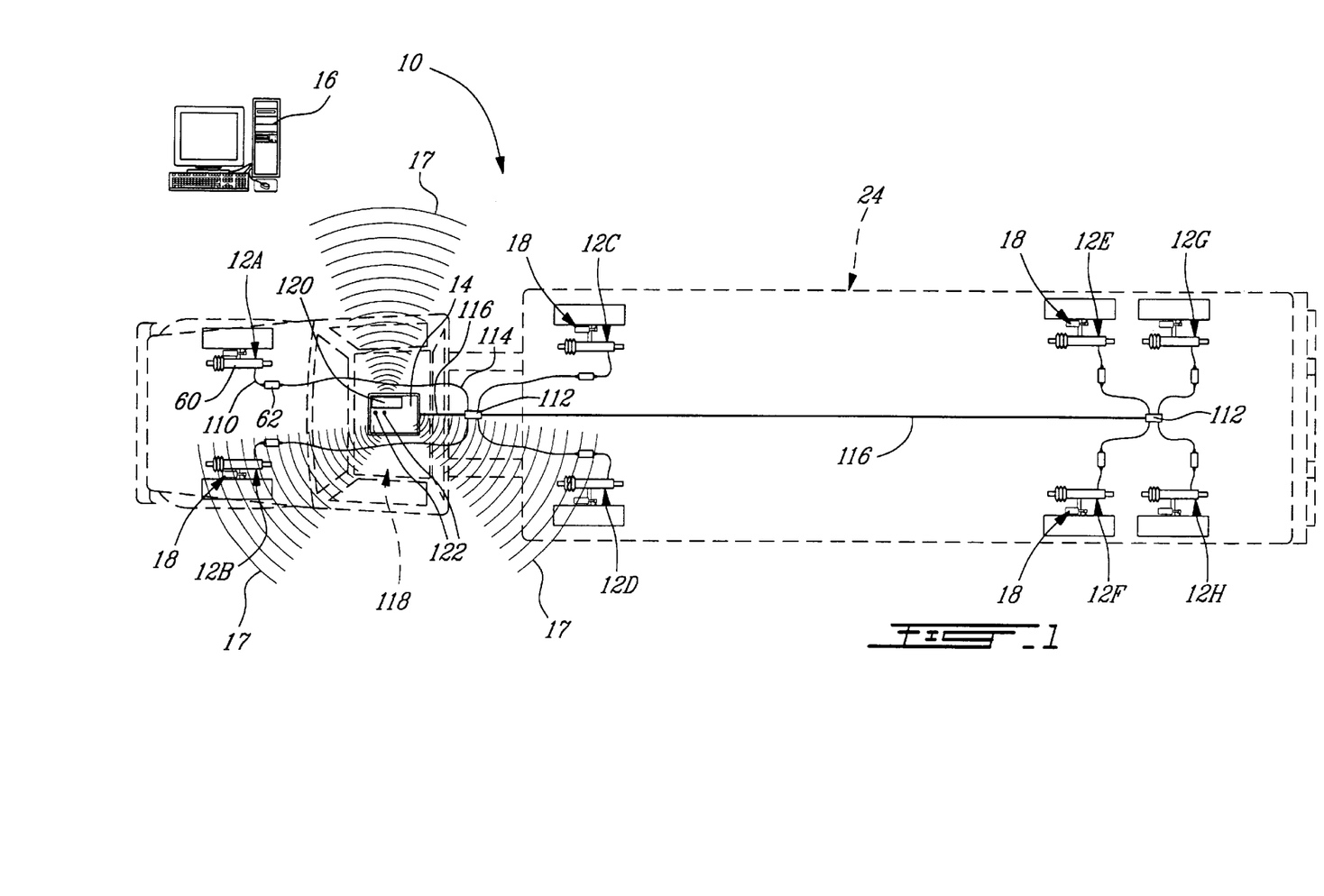
FIG. 1 is a schematic top plan view of a brake monitoring system according to a first embodiment of the present invention, as mounted on a trailer truck.

Referring to FIG. 1 of the appended drawings, a brake wear managing system 10 according to a first embodiment of the present invention will be described.

The brake wear managing system 10 comprises a plurality of sensor assemblies 12A–12H, an on-board controller 14 and a remote controller 16.

In order to better describe the sensor assemblies 12A–12B, the configuration and the principle of operation of a brake assembly 18 onto which each of the sensor assemblies 12A–12B is to be mounted will first be described by referring to FIG. 2 to FIG. 5 of the appended drawings.

Figure 2:
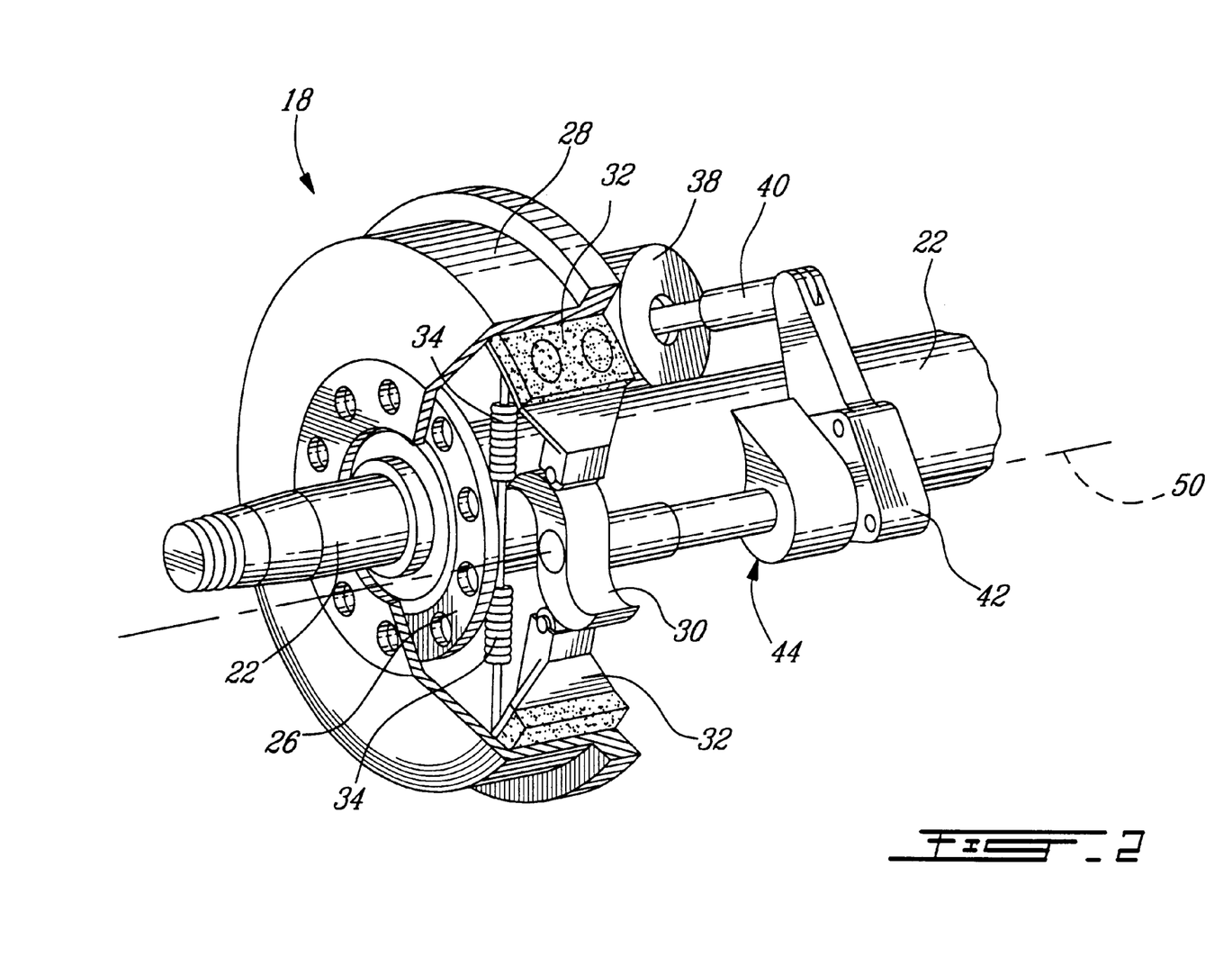
FIG. 2 is a perspective partially sectional view of a brake assembly onto which a brake monitoring system according to a first embodiment of the present invention is to be mounted.

As commonly known by a person well versed in the art, the brake assembly 18 is mounted to one of the axles 22 of a truck 24 (in dashed line on FIG. 1). A wheel (not shown) is mounted to the axle 22 via a drum brake 28, fixedly mounted to a disk 26 via bolts (not shown) or other securing elements.

The brake action is actuated by the rotation of an S-cam expander 30 that pushes a pair of brake shoes 32 onto the internal surface of the drum brake 28. When no forces are applied to rotate the S-cam expander 30, the brake shoes 32 are pulled away from the drum brake 28 by two biasing springs 34.

Rotation (arrows 36 and 36' on FIG. 3) of the S-cam expander 30 is actuated by an air cylinder 38 (see FIG. 4) having a push rod 40 that is mechanically connected to the S-cam expander 30 via a lever 42 and a brake camshaft 44. The push rod 40 has a longitudinal axis 46. The lever 42 and the camshaft 44 transfer the longitudinal movement of the push rod 40 along axis 46 (arrows 48 and 48' on FIG. 3 and FIG. 4) in a rotational movement (see respective arrows 36 and 36') of the S-cam expander 30 about a rotational axis 50. It is to be noted that the push rod 40 is secured to the lever 42 via a yoke 51 and a bolt 52.

Figures 3, 4:
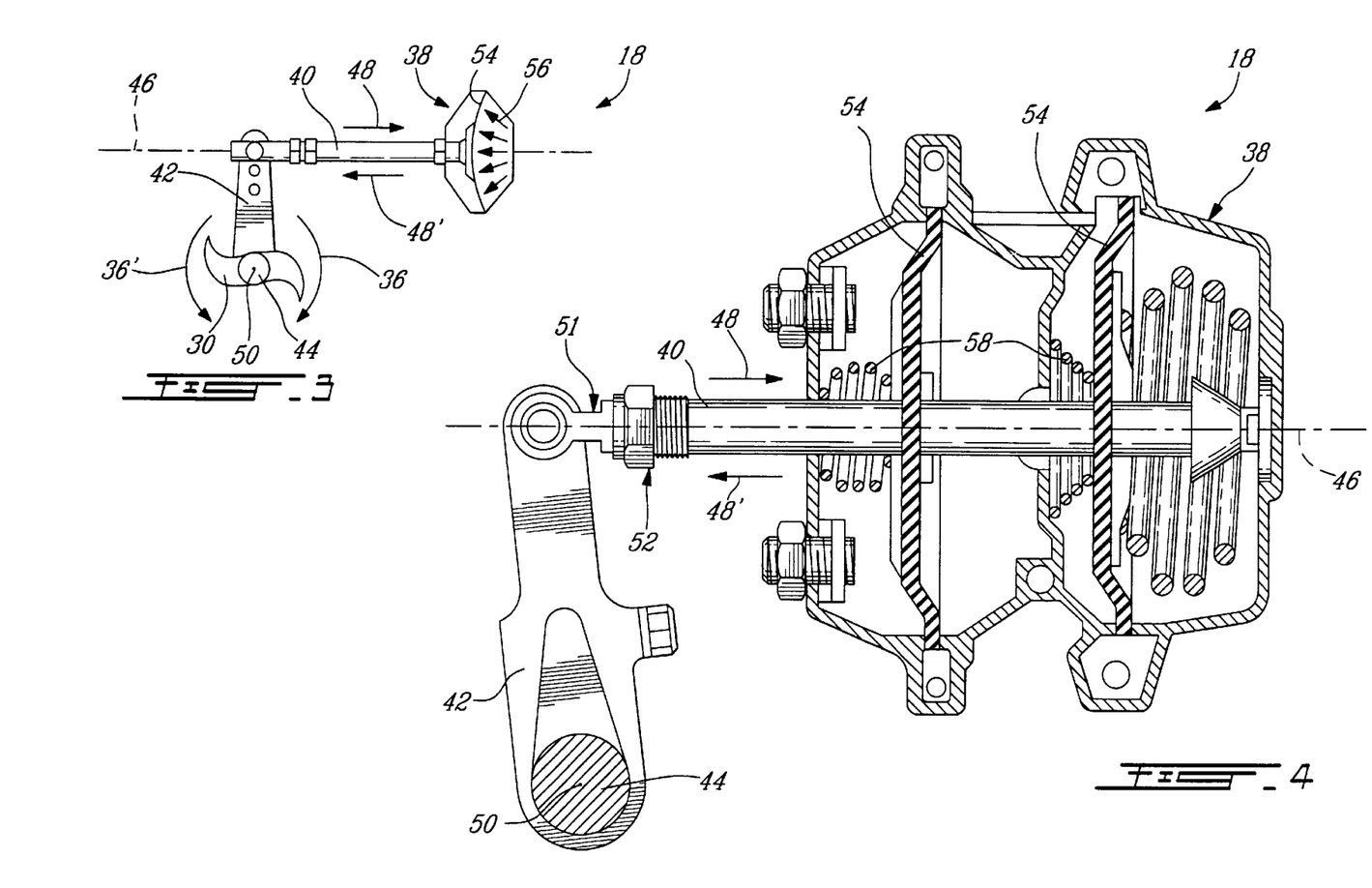
FIG. 3 is a schematic side elevational view illustrating the operation of the brake assembly of FIG. 2.
FIG. 4 is a sectional side elevational view of the air drums of the brake assembly of FIG. 2.

As can be seen from FIG. 4, the air cylinder 38 contains diaphragms 54, that uses the air pressure (illustrated by arrows 56 in FIG. 3) behind the diaphragm 54 to produce a linear driving force pushing the push rod 40, that is secured to the diaphragms 54, in the direction of arrow 48'. When the pressure is released in the air cylinder 38, springs 58 (FIG. 4) pull back the push rod 40 in the direction of arrow 48.

Since the braking action is caused by the contact between the brake shoes 32 and the internal surface of the drum brake 28 and that this contact is indirectly triggered by air pressure onto the diaphragms 54, any wear of parts or loosening between the diaphragms 54 and the brake shoes 32 can cause failure of the braking action, when the push rod 40 maximum stroke has been reached.

As will appear obvious to someone skilled in the art, loosening of the mechanism of a drum brake assembly 18 will usually result in travel of its push rod 40. Measurement of the position of the push rod 40 can thus allow the assessment of brake wear and therefore of possible failure of the braking action.

Figure 5:
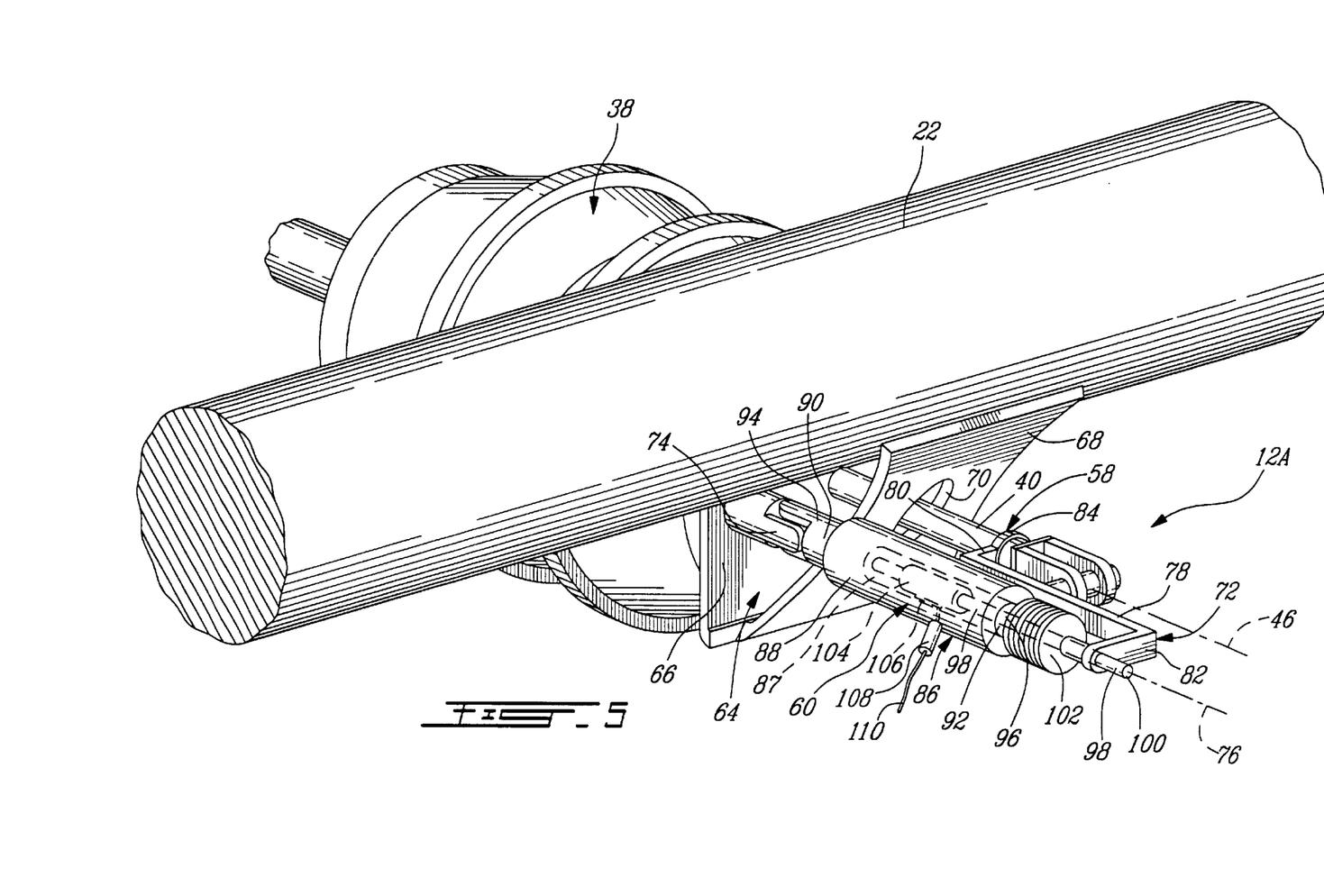
FIG. 5 is a perspective view of a sensor assembly of the brake monitoring system of FIG. 2.

Turning now to FIG. 5 of the appended drawings, sensor assemblies 12A–12H will now be described. Since the sensor assemblies 12A–12H are identical and for concision purposes, only the sensor assembly 12A will be described hereinbelow.

The sensor assembly 12A includes a mounting assembly 58, a sensor 60 and a sensor electronic circuit 62 (see FIG. 1).

The mounting assembly 58 is configured to mount the sensor 60 to the push rod 40 for movement in unison.

A V-plate 64, present on most trucks, is used to mount the air cylinder 38 to the axle 22. The V-plate 64 has a first portion 66 secured to the air cylinder 38 and a second portion 68 secured to one of the axles 22 of the vehicle 24. The second portion 68 includes an aperture 70 for the passage of the push rod 40.

The mounting assembly 58 includes an S-shaped bracket 72 and a sensor-securing nut in the form of a universal joint 74. The universal joint 74 is mounted to one of the air drum's 38 mounting bolts and is centered about a longitudinal axis 76 generally parallel to the push rod 40.

The bracket 72 has a central flat portion 78 and first and second opposite perpendicular end portions 80 and 82. The first end portion 80 includes an integral ring 84 so configured and sized to snugly fit on the push rod 40. Of course, a fastener (not shown) may also be used to secure the ring 84 to the rod 40. The second end portion 82 includes an aperture (not shown) to receive a portion of the sensor 60 as will be described hereinebelow.

The bracket 72 and the universal joint 74 are so advantageously configured and sized as to facilitate the installation of the sensor 60 near the push rod 40. The use of one the air drum's mounting bolts also facilitates the installation on the sensor assembly 12. Indeed, these mounting bolts are usually and easily accessible.

It has also been found that the displacement of the push rod 40 has a small vertical component due to rotational movement of the lever 42. The use of the universal joint 74 is therefore advantageous since it allows the sensor 60 to follow the movement of the push rod 40 in more than one direction. The measurements taken by the sensor 60 is therefore more reliable. Its lifetime also increases.

It is to be noted that the bracket 72 and the other parts of the mounting assembly 58 can have other configurations without departing from the spirit of the present invention.

The sensor 60 includes a cylindrical hollow body 86 having a large portion 88 and two narrow end portions 90 and 92, corresponding respectively to the proximal end 94 and the distal end 96 of the cylindrical hollow body 86. The cylindrical hollow body 86 includes a cylindrical bore 87. The bore 87 is generally centered about the longitudinal axis 76.

The sensor 60 further includes a sliding rod 98 having a proximate end 100. The rod 98 is so coaxially and slidably mounted in the bore 87 as to reciprocate. An expansible cover 102 is provided to protect the slip joint between the sliding rod 98 and the hollow body 86. The sensor 60 also includes a cylindrical magnet 104 so fixedly mounted to the sliding rod 98 as to be in the large portion 88 of the hollow body 86, and a linear Hall effect sensor 106 mounted to the inner surface of the large portion 88 of the hollow body 86. The large portion 88 allows sufficient space for the cylindrical magnet 104 and the Hall effect sensor 106. As will appear obvious to a person skilled in the art, the Hall effect sensor 106 is magnetically coupled with the cylindrical magnet 104.

The narrow end portion 90 of the hollow body 86 is fixedly connected to the first portion 66 of the V-plate 64 via the universal joint 74. The proximate end 100 of the sliding rod 98 is fixedly mounted to the second end portion 82 of the bracket 72.

Since the sliding rod 98 of the sensor 60 is fixedly connected to the push rod 40 via the bracket 72 and since the sensor 60 is generally parallel to the push rod 40, a longitudinal movement of the push rod 40 infers a longitudinal movement to the sliding rod 98 of the sensor 60 and to the cylindrical magnet 104 mounted thereto. As will be explained hereinbelow, the Hall effect sensor 106 measures this movement and generates a signal accordingly. The sensor, according to a preferred embodiment of the present invention, allows measurement of longitudinal movement of the push rod in the order of 1/100 of an inch (about 0.25 mm).

Since the sensor 60 is positioned near the brake assembly 18, it is subjected to adverse conditions, such as corrosion, road hazards, cold and hot temperatures, etc. As will appear obvious to someone skilled in the art, the sensor 60 has been designed to withstand such adverse conditions while providing accurate readings. Indeed, the hollow body 86 and the sliding rod 98 of the sensor 60 are preferably made of brass for its mechanical strength and low coefficient of friction, and also because it does not affect the magnetic field produced by the cylindrical magnet 104 and therefore the reading of the Hall effect sensor 106.

The hollow body 86 is advantageously covered by UHMW (Ultra High Molecular Weight) material, such as UHMW polyethylene, to protect the sensor 60 from abrasion or impact. For the same reason and also to insulate the slip joint between the sliding rod 98 and the hollow body 86, the expansible cover 102 is advantageously made of neoprene.

The cylindrical hollow body 86 includes a conduit 108 to allow passage of a wire 110 connecting the linear Hall effect sensor 106 to the sensor electronic circuitry 62 (see FIG. 1).

In a preferred embodiment of the present invention, each sensor 60 is connected to a sensor electronic circuit 62.

The sensor electronic circuitry 62 includes a micro controller, a memory chip, a communication chip and a tell tale Hall effect sensor (not shown). These components are neither restrictive nor essential, and other components producing globally the same results described hereinbelow can also be used.

The micro controller is configured to collect the signal generated by the Hall effect sensor 106 and to correct this signal. For example, the micro controller corrects the voltage for temperature using the readings from the tell tale Hall effect sensor. An adjusted polynomial equation is also used to transform the corrected voltage signal to a push rod position value.

The micro controller is also advantageously programmed to take readings at intervals defined by pre-determined criteria.

The memory chip can advantageously store values that are to be used either by the sensor 60, the on-board controller 14 or the remote controller 16. For example, each memory chip can be programmed with different brake wear thresholds or sensor parameters.

The micro controller can also advantageously detect other problems in the brake assembly 18, such as pressure drop in the air drums 38 and also generate an alarm accordingly by analyzing the previously stored values.

As will appear obvious to a person skilled in the art, the fact that the micro-controller is programmable gives flexibility to the brake wear managing system 10.

To protect the sensor electronic circuitry from vibration, abrasion or impact, the sensor electronic circuitry is advantageously covered with a sealant such as epoxy adhesive, According to a most preferred embodiment of the present invention, two junction boxes 112, one for the front wheels, another for the rear wheels, are used to relay signals from each sensor electronic circuit 60 to the on-board controller 14. These junction boxes 112 are optional.

Sensor signals, in the form of push rod position values, are then transferred to the on-board controller 14 by the communication chip via the junction boxes 112. Conventional data cables 114 and 116 respectively connect each sensor 60 to one of the junction boxes 112 and the two junction boxes 112 to the on-board controller 14. Other connecting means, such as a radio emitter and a radio receiver can also be used for these data connections. The on-board controller 14 is configured to receive the signals from each sensor 12.

The number and location of the junction boxes 112 may vary without departing from the spirit of the present invention.

The on-board controller 14 is advantageously located in the tractor unit 118 of the truck 24 and more specifically on the control board (not shown) thereof. The driver of the truck can therefore see the on-board controller 14 while he is driving.

The on-board controller 14 has a display 120, a plurality of program buttons 122 and ports (not shown) to connect the electrical wires 116 coming from the junction boxes 112.

The display 120 may take many forms from a display monitor, a LCD (Liquid Crystal Device) screen to simple indicator lights.

The display 120 can be replaced or supplemented by another output device such as an audio alarm. Conventional display and audio alarm are believed well known in the art and will not be described in further detail herein.

The on-board controller 14 is configured to handle communications between the remote controller 16 and the sensor assemblies 12A–12H, to generate brake wear condition signals in response to sensor signals and to display information on the display 120 as will be described hereinbelow.

The on-board controller 14 is also configured to assess the validity of the sensor assemblies 12A–12H signals by analyzing and cross comparing those signals.

Brake wear condition signals can take many forms from push rod position values, percentages of threshold, alarm signals to time before brake failure, etc. The brake wear condition signals may alternatively be analog or digital. Evidently, the on-board controller 14 is configured to produce such brake wear condition signals in response to sensor signals.

Although, the on-board controller 14 and the sensor electronic circuitry 62 have been described as two separate components, it is believed within the reach of someone skilled in the art to incorporate these two components into a single assembly configured to perform the tasks of both the controller 14 and the sensor electronic circuitry 62.

According to the first embodiment of the present invention, the on-board controller 14 further includes an on-board emitter/receiver (not shown) to exchange information with the remote controller 16 (see propagated signal 17 in FIG. 1).

The remote controller 16 is advantageously in the form of a computer that includes user input devices, such as a keyboard, a mouse, a touch screen and/or a microphone with voice recognition software, output devices such as a display monitor, speakers and/or a printer, a remote emitter/receiver to exchange information from the on-board controller 14 and storing devices such as RAM (Read Access Memory) or ROM (Read Only Memory) memories, a CD-ROM drive, etc.

Optionally, the remote controller 16 can further be connected to a network of computers such as the Internet for sharing data with other controllers or computers.

Alternatively, the remote controller can be in the form of a laptop computer 124 (see FIG. 6), a handheld PC, a palm-size PC or any other computer system configured to perform the functions described above.

The on-board and remote emitter/receivers are part of a conventional wireless communication system, configured to exchange information between the on-board controller 14 and the remote controller 16. The emitter/receiver can take many forms including, a radio transceiver and a wireless phone. Since such conventional wireless communication systems are believed well known in the art, they will not be described in further detail herein.

The communication system can advantageously be connected to a GPS (Global Positioning System) transmission unit (not shown) to allow monitoring of the geographic position of the vehicle.

Figure 6:
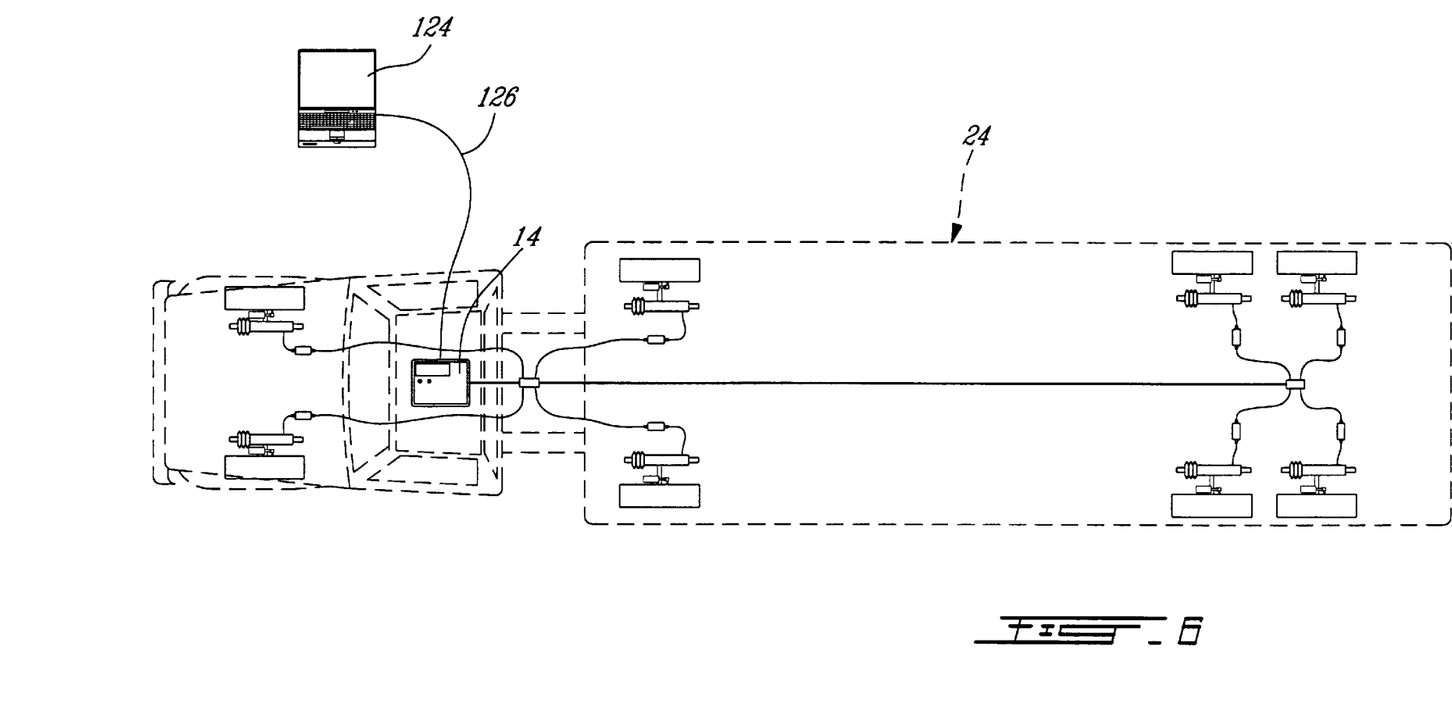
FIG. 6 is a schematic top plan view of a brake monitoring system according to a second embodiment of the present invention, as mounted on a trailer truck.

Turning now briefly to FIG. 6 of the appended drawings, a second embodiment of the present invention will now be described. According to this second embodiment of the present invention, the remote controller 124 is directly connected to the on-board controller 14 via a data cable 126. As will appear obvious to a person with ordinary skills in the art, the above-described remote communication system in this case not required. When such a cable connection is used between the remote and on-board controllers 124 and 14 is used, the data is stored in the on-board controller 14 during normal operation of the vehicle 24 and transferred to the remote controller 124 during vehicle's inspection and or repairs.

The principle of operation of the brake managing system 10 will now be described in further detail.

According to the size and configuration of the vehicle 24 onto which the brake managing system 10 is installed, each sensor assembly 12 is assigned a network address.

In a preferred embodiment, the remote controller 16 (or 124) is programmed with a graphical user interface to allow the user of the system 50 to visualize the position of each sensor assembly 12A–12H on a schematic representation of the vehicle 24, knowing its network address. Different configurations of vehicles are advantageously stored in the remote controller 16 memory.

Both the on-board and the remote controller 14 and 16 can be used to visualize the travel of all push rods 40 in percentage of pre-determined thresholds or in absolute distance. If one of the sensor assemblies 12A–12H is malfunctioning or if the connection is broken, a corresponding message is sent to the on-board controller 14 and/or remote controller 16 that can then generate an alarm.

When the driver depresses the brake pedal, each push rod 40 is pushed in the direction of arrow 48' (FIG. 3), as explained hereinabove. The longitudinal displacement of the push rod 40 is detected by the sensor 60. Since this longitudinal displacement characterizes the brake wear, the sensor 60 generates a signal responsive to brake wear. The on-board controller 14 then receives the signals from each sensor assembly 12. If the on-board controller 14 does not receive the signal from one of the sensor assemblies 12A–12H, a message is shown accordingly on the display 120 of the on-board controller 14. Alternatively, the driver can access information stored by each sensor assembly 12, by using the program buttons 122 of the on-board controller 14.

The on-board controller 14 then compares each push rod travel with a corresponding predetermined threshold. These two values are transferred from the micro controller of the sensor assemblies 12A–12H to the on-board controller 14. The on-board controller 14 then shows on the display 120, for each brake assembly 18, the push rod 40 travel and may trigger an alarm accordingly.

The remote controller 16 is configured to be operated in either two different modes: maintenance mode or operational mode. Each of these modes can be implemented on a single remote controller or on two distinct controllers, configured to perform functions as described hereinbelow.

The maintenance mode is used mainly for the installation, the verification and maintenance of the sensor assemblies. More precisely, the maintenance mode allows to program the sensor assemblies 12A–12H according to pre-determined operating conditions.

The maintenance mode allows the remote controller to send signals to the sensor assemblies 12A–12H to verify the operating conditions thereof.

For each sensor assembly 12, a plurality of pushrod travel thresholds can be programmed. Different thresholds can thus be programmed to warn the driver or a remote technician at different stages of brake wear. The threshold values can be the same for all sensor assemblies 12A–12H or they can be different.

In a preferred embodiment of the present invention, two different thresholds can be programmed for each assembly 12. The first threshold could correspond, for example, to a 1¾ inch (about 4.45 cm) push rod 28 travel and the second threshold to a 2 inch (about 5.08 cm) travel of the rod 28. Two different levels of alarm can be assigned to those thresholds. The typical push rod 28 travel is about 2 inches (about 6.03 cm).

The operational mode allows to perform the remote monitoring of the brake assemblies 12A–12H, the computing of brake wear forecasts, the scheduling of brake maintenance and the dispatching of vehicles according to a maintenance schedule.

The operational mode also provides visual tools to assess the operating performance of the sensor assembly 12A–12H and to help identify problems of the brake assemblies 18.

The operational mode can also be used to stock data and to use those data to prepare statistical analyses on the brake assemblies 18, such as the average life span, time to reach a certain wear percentage, etc.

A brake managing system according to embodiments of the present invention allows for the creation of historical databases. These databases can includes information such as push rod positions in time, break wear conditions by vehicle, by driver, etc. The databases could facilitate the detection of recurrent problems.

The remote controller 16 can also use the information in such databases to forecast brake wear, thus optimizing the lifetime of each brake assembly without risking brake failure. The calculation can optionally be performed by each micro controller or by the on-board controller.

Obviously, the remote controller 16 can be configured to perform only some of the functions cited above.

In a preferred embodiment of the present invention, the controller on-board controller 14 can collect information from the odometer (not shown) of the vehicle 24. That information can be sent from the controller to each micro controller to be stored. All the readings done by the sensor assemblies 12A–12H could then be indexed according to the mileage of the vehicle. The remote controller 16 could further use those data to compute forecasts, for example, in function of the mileage.

The two modes of operation of the brake wear managing system can be implemented by two different remote controllers or by a single one without departing from the spirit of the present invention.

It is also believed within the reach of someone skilled in the art to configure the remote controller 16 (or 124) to perform the above-mentioned functions.

Even though the preferred embodiment has been described as one mounted to a truck, a brake wear managing system, according to the present invention, can also be installed on other vehicles such as buses.

Although the present invention has been described hereinabove by way of preferred embodiments thereof, it can be modified, without departing from the spirit and nature of the subject invention as defined in the appended claims.

What is claimed is:

1. A brake wear managing system for a vehicle provided with at least one drum brake assembly including a push rod and an air drum bolt, said brake wear managing system comprising:

at least one sensor assembly including a sensor and a mounting assembly to mount said sensor to one of the at least one drum brake assembly for movement in unison with the push rod; said mounting assembly including a universal joint connecting said sensor assembly to said air drum bolt of said drum brake assembly; the sensor being so configured as to generate a signal responsive to brake wear; and an on-board controller coupled to each sensor; said on-board controller being configured to receive said signal from each sensor and to generate brake wear condition signals accordingly.

2. A brake wear managing system as recited in claim 1, wherein said sensor includes a hollow body having a cylindrical bore, a sliding rod so mounted in said hollow body as to reciprocate, a magnet mounted to said sliding rod, a Hall effect sensor mounted in said cylindrical hollow body so as to be magnetically coupled with said magnet and to generate a signal responsive to the position of said magnet.

3. A brake wear managing system as recited in claim 2, wherein at least one of said cylindrical hollow body and said sliding rod is made of brass.

4. A brake wear managing system as recited in claim 2, wherein said hollow body is covered by an ultra high molecular weight material.

5. A brake wear managing system as recited in claim 1, further comprising at least one junction box for relaying signals from said at least one sensor assembly to said on on-board controller.

6. A brake wear managing system as recited in claim 1, wherein the vehicle includes a tractor unit; said on-board controller being located in said tractor unit.

7. A brake wear managing system for a vehicle provided with at least one drum brake assembly including a push rod, said brake wear managing system comprising:

at least one sensor assembly including a sensor and a mounting assembly to mount said sensor to one of the at least one drum brake assembly for movement in unison with the push rod; said mounting assembly including a bracket having first and second opposite end portion; said first end portion being so configured to be secured to said push rod and said second end portion being so configured to be secured to said sliding rod; said sensor including a hollow body having a cylindrical bore, a sliding rod so mounted in said hollow body as to reciprocate, a magnet mounted to said sliding rod, a Hall effect sensor mounted in said cylindrical hollow body so as to be magnetically coupled with said magnet and to generate a signal responsive to the position of said magnet; said sensor being so configured as to generate a signal responsive to brake wear; and an on-board controller coupled to each sensor; said on-board controller being configured to receive said signal from each sensor and to generate brake wear condition signals accordingly.

8. A brake wear managing system as recited in claim 7, wherein said bracket is a S-shaped bracket.

9. A brake wear managing system as recited in claim 7, further comprising at least one junction box for relaying signals from said at least one sensor assembly to said on on-board controller.

10. A brake wear managing system as recited in claim 7, wherein the vehicle includes a tractor unit; said on-board controller being located in said tractor unit.

11. A brake wear managing system for a vehicle provided with at least one brake assembly, said brake wear managing system comprising:

at least one sensor assembly including a sensor and a mounting assembly to secure said sensor to one of the at least one brake assembly; the sensor being so configured as to generate a signal responsive to brake wear;

an on-board controller coupled to each sensor; said on-board controller being configured to receive said signal from each sensor and to generate brake wear condition signals accordingly; and a remote controller coupled to said on-board controller; said remote controller being configured to receive at least one of a) said sensor signals and b) said break wear condition signals; said remote controller being so configured as to generate a brake wear history database.

12. A brake wear managing system as recited in claim 11, wherein said remote controller is coupled to said on-board controller via a wireless communication system.

13. A brake wear managing system as recited in claim 12, wherein said wireless communication system is connected to a GPS transmission unit to allow remote monitoring of the geographic position of the vehicle.

14. A brake wear managing system as recited in claim 12, wherein said wireless communication system includes a radio transceiver.

15. A brake wear managing system as recited in claim 11, wherein said remote controller is coupled to said on-board controller via a data cable.

16. A brake wear managing system as recited in claim 11, wherein said remote controller is in the form of a computer.

17. A brake wear managing system as recited in claim 11, wherein said remote controller is further connected to a computer network.

18. A brake wear managing system as recited in claim 11, wherein said remote controller is programmed with a user interface.

19. A brake wear managing system as recited in claim 11, wherein said remote controller is configured to be operated in maintenance mode allowing said remote controller to send signals to said at least sensor assembly to verify the operating conditions thereof.

20. A brake wear managing system as recited in claim 11, wherein said remote controller is configured to be operated in operation mode, wherein said remote controller is configured to do at least one of computing brake wear forecasts, scheduling of brake maintenance, dispatching of vehicles in a fleet, storing brake wear condition data, creating a historical database and preparing statistical analysis on said at least one brake assembly.

21. A brake wear managing system for a vehicle provided with at least one brake assembly, said brake wear managing system comprising:

at least one sensing assembly including sensing means and mounting means to secure said sensor to one of the at least one brake assembly; the sensing means being so configured as to generate a signal responsive to brake wear;

an on-board controlling means coupled to each sensing means; said on-board controlling means being configured to receive said signal from each sensing means and to generate brake wear condition signals accordingly; and a remote controlling means coupled to said on-board controller; said remote controlling means being configured to receive at least one of a) said sensor signals and b) said break wear condition signals; said remote controlling means being so configured as to generate a brake wear history database.

* * * * *